United States Patent Office 3,499,639
Patented Mar. 10, 1970

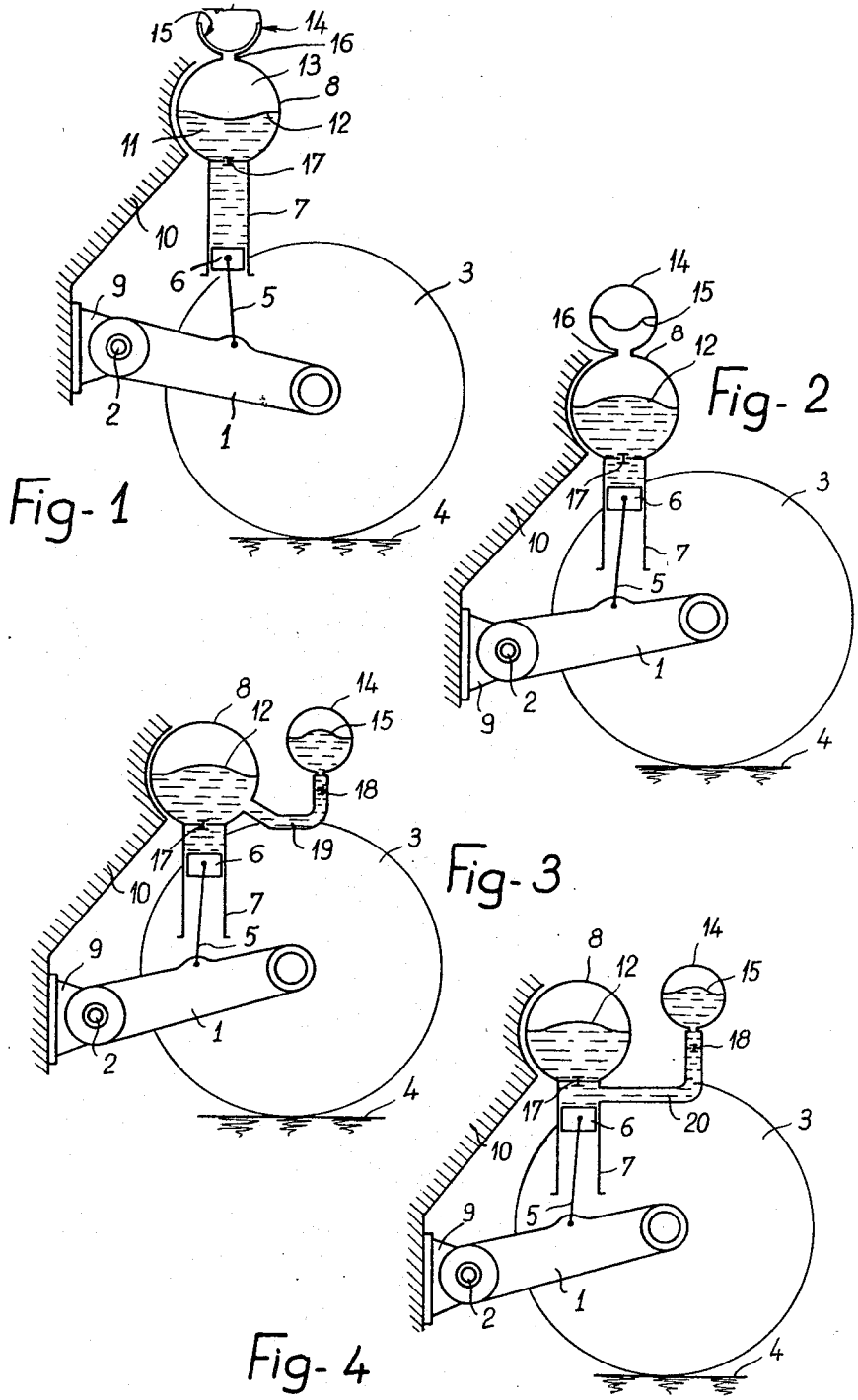

3,499,639
HYDROPNEUMATIC SUSPENSION SYSTEMS OF VEHICLES
Paul Bonnotte, Suresnes, France, assignor to Societe Anonyme de Vehicules Industriels et d'Equipments Mecaniques SAVIEM, Suresnes, France
Filed Apr. 3, 1967, Ser. No. 627,738
Claims priority, application France, Apr. 27, 1966, 59,268
Int. Cl. F16f 9/08; B60g 11/26
U.S. Cl. 267—64         2 Claims

ABSTRACT OF THE DISCLOSURE

Hydropneumatic suspension system element utilizing a constant mass of gas, for automotive vehicles, comprising a main vessel having slidably mounted in its cylindrical portion a piston co-acting with a pressure-transmitting fluid, characterised in that said vessel is adapted to communicate with one or a plurality of auxiliary vessels containing additional masses of gas precompressed at pressures other and higher than the normal pressure prevailing in the main vessel, each auxiliary vessel being separated by a flexible diaphragm from said main vessel and from said pressure-transmitting fluid also acting as a damping means.

---

The present invention relates to improvements in hydropneumatic suspension systems of the so-called "constant gaseous mass" type, and more particularly to suspension systems intended for off-the-road vehicles and characterised by the great amplitude of oscillation of the wheel carrier arms.

In fact, it is known that the reactions of suspension systems of this character increase very rapidly with their deflection and this feature is particularly advantageous on road vehicles subjected only to shallow unevennesses producing but moderate suspension beats.

The relationship between the pressure $p$ and the variable volume $v$ enclosing a given gaseous mass is:

$$pv^n = p_0 v_0^n$$

The index $o$ corresponds to the initial pressure and volume values, and $n$ is a constant depending on the manner in which the change of volume took place; thus, $n=1$ in the case of an isothermal transformation and 1.4 in the case of an adiabatic transformation, if air or diatomic gas is used. In the specific case of suspension system, $n$ lies in practice between 1.3 and 1.35.

Now the flexibility of a suspension system is proportional to the ratio $dl/dp$, wherein $dl$ is the deflection produced by a load increment and causing an increase $dp$ in the gas pressure in the vessel. In the case of a cylindrical vessel having a vertical axis, the volume variation $dv$ is proportional to the deflection $dl$ and in this case the flexibility is proportioned to the ratio $dv/dp$ and, making up the relation between $p$ and $v$, it is inferred that the flexibility is universely proportional to $$p^{1+\frac{1}{n}} = p^{1.74}$$

flexility is proportional to the power 1.74 of the pressure within the gaseous mass. In other words, considering a suspension system having initially an adequate rigidity for the normal road traffic oscillation amplitudes, it would be illusive to expect the use of great deflection values under off-the-road conditions, for the pressure increment according to the aforesaid power 1.74 creates a real "barrier" when great deflections take place. The flexibility may also be expressed as a function of the volume of compressed gas and is proportional to $v^{n+1} = V^{2.35}$. This volume decreases considerably with the corresponding deflection increment caused by the load.

It is the object of the present invention to provide an additional flexibility available when necessary, by making available in an auxiliary vessel separated by a flexible diaphragm from the main vessel an additional gaseous mass having a predetermined value $m_1$ compressed at a determined pressure $p_1$ and filling a volume $V_1$ of said auxiliary vessel. As long as the pressure in the main vessel remains below the above-defined value $p_1$ the diaphragm of the auxiliary vessel remains rigid and this vessel remains inoperative; however, when this pressure $p_1$ is attained in the main vessel both vessels act as a single vessel having a volume $v_1 + V_1$, $v_1$ being of course the volume of the gaseous mass contained in the main vessel, under the pressure $p_1$.

Under these conditions, the flexibility is suddenly increased: before, it was proportional to $v_1^{2.35}$, now it is proportional to $(v_2 + V_1)^{2.35}$.

Then, if the pressure exceeds the aforesaid value $p_1$, the combined gaseous volumes are submitted to the same law of compressibility, the diaphragm disposed therebetween being deflected accordingly and effortlessly.

If required by the magnitude of the deflection or bumps to be controlled, a plurality of other auxiliary vessels containing other gaseous masses under other precompression pressures may be added to the system, each auxiliary vessel being separated by a flexible diaphragm from the main gaseous mass of the main vessel.

The inventive hydropneumatic suspension system element, utilizing a constant mass of gas for automatic vehicles, comprises a main vessel having a first cylindrical portion with a slidably mounted piston connected to a wheel carrier arm and coacting with a pressure transmitting fluid in said cylindrical portion, and a second spherical portion solid with the body of the vehicle and separated by a flexible diaphragm in two compartments the first of which is in communication with said cylindrical portion and contains said pressure transmitting fluid, and the second compartment is filled by a mass of gas. The main vessel is in communication with one or more auxiliary vessels, each containing a flexible diaphragm and an additional mass of gas. The additional mass of gas is precompressed at a pressure other than and higher than the pressure prevailing in the main vessel when there is a determined normal load supported by the wheel of the vehicle. The flexible diaphragm of the auxiliary vessel separates the auxiliary mass of gas from the main vessel and acts as a valve closing the communication between the auxiliary vessel and the main vessel. A valve for throttling the pressure transmitting fluid is disposed between the first and second portions of the main vessel and the fluid and valve also act as a damping means.

The aforesaid auxiliary vessels may also open into the main vessel, either into the gas-filled portion thereof, or into the portion containing the transmission fluid which is throttled for shock-absorbing purposes.

The advantageous features characterising this system are also evidenced in the case of vehicles having a high ratio of the sprung mass under load to the sprung mass under no-load conditions, and the rigidity under load of the suspension system of vehicles of this type, which would otherwise become prohibitive, is thus corrected by the auxiliary vessel of the system providing an additional flexibility under load, due to the proper selection of its pre-compression pressure value.

Another feature characterising the system of this invention is that it is self-correcting in case of considerable differences in the surrounding temperature.

In fact, a very low temperature reduces the static volume $v$ of the gas in the main vessel; in other words, it "stiffens" the suspension system; but as the pressure $p'$ of the additional gaseous mass $m'$ filling this volume $v'$ also decreases, its action becomes effective in the case of smaller bumps or deflections. Obviously, the opposite effect, that is, the excessive flexibility at high temperatures, is also corrected, the action of the complementary gaseous mass being retarded by the corresponding increase of the pressure $p'$ of this gaseous mass.

The objects and advantageous features of the present invention will appear more clearly as the following description proceeds with reference to the accompanying drawing, in which:

FIGURE 1 illustrates diagrammatically by way of example a suspension system element according to this invention, in the expanded position;

FIGURE 2 illustrates the same element with the piston forced inwards;

FIGURE 3 is a similar view showing an element provided with two fluid shock absorbers disposed in series;

FIGURE 4 illustrates a modified construction with two fluid shock absorbers disposed in parallel.

Figure 5:
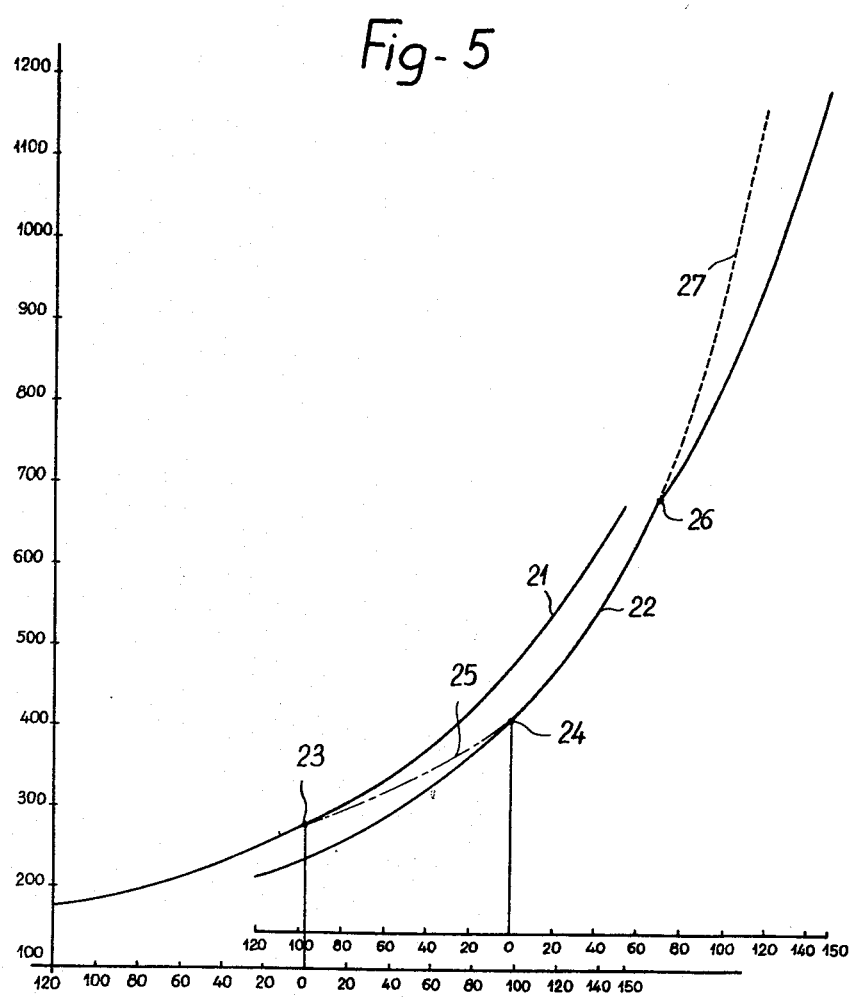
FIGURE 5 is a diagram plotting the variation in the deflection of a suspension element as a function of the load.

Referring firstly to FIGURE 1, a wheel carrier arm 1 is pivoted at 2 and has mounted on its outer end the wheel 3 of the vehicle which rolls on the ground 4. This arm 1 is connected by a link 5 to a piston 6 slidably mounted in the cylindrical portion 7 of the main vessel 8 of the suspension system.

The vessel 8 and the bracket 9 carrying the pivot pin 2 of the wheel arm 1 are rigid with the body 10 of the vehicle.

The load supported by the wheel 3 is transformed into a pressure transmitted by the oil or like fluid 11 to the mass $m$ of the gas 13 from which it is separated by a flexible diaphragm 12.

The present invention consists essentially in adding an auxiliary vessel 14 containing a mass $m'$ of gas under a pressure $p'$. As long as the gas pressure of the gas 13 in vessel 8 is lower than pressure $p'$, the flexible diaphragm 15 therein acts as a valve to close the orifice 16 interconnecting the two vessels. When the deflection increment is such that the pressure of gas 13 in the vessel 8 exceeds the value $p'$, the diaphragm 15 is distorted and becomes "transparent," to the masses $m$ and $m'$ disposed on either side thereof (FIGURE 2), and these masses will then behave like a single, unitary mass $m+m'$ having a greater flexibility than mass $m$, as already explained hereinabove.

When the suspension expansion causes the pressure of the gas 13 to drop to a value below $p'$, the mass $m'$ fills again the complete volume $v'$ of vessel 14 and the diaphragm 15 engages its lower wall, the flexibility decreasing suddenly after the thus automatic elimination of the gaseous mass $m'$.

On the other hand, the suspension bumps are absorbed by providing a valve 17 for throttling the pressure-transmitting fluid, this valve 17 being disposed between the top of the cylinder and the other portion of the main vessel; however, this device may prove inadequate for sufficiently reducing the oscillation frequency of the suspension system or making its oscillations non-periodic; under these conditions other fluid-throttling valves may be provided by modifying the relative position of the two vessels.

The vessel 14 (FIGURE 3) connected in this case by a pipe 19 to the lower portion of the main vessel 8 is partly filled with damping fluid. A valve 18 at the inlet of the auxiliary vessel 14 is adapted to throttle the fluid flowing into this vessel, that is, when the pressure value $p'$ is overstepped, and in this case the other valve 17 will throttle the whole of the fluid forced therethrough by the stroke of piston 6.

The pipe 20 (FIGURE 4) interconnecting the vessels 8 and 14 opens into the upper end of cylinder 7, between the piston 6 and valve 17. Thus, both valves 17 and 18 are disposed in parallel and will each throttle one fraction of the displaced fluid. Thus, adequate means are available for adjusting modifying and adapting, if necessary, the damping action in a suspension system.

If desired, a plurality of auxiliary vessels may be used instead of a single one, these auxiliary vessels being adequately connected to the main vessel. Each auxiliary vessel has in this case a predetermined volume and contains a predetermined mass of gas under a preselected pressure; therefore, by combining these parameters a suspension system submitted to a well-defined law of flexibility can be obtained with the desired approximation.

The curves shown in the diagram of FIGURE 5 are based on the following data:

Weight of sprung portion under no-load conditions _____ kg__ 275
Weight of sprung portion under load _____ kg__ 400
Polytropic exponent _____ $n=1.35$ In the diagram the loads in kg. are plotted in ordinates, against the wheel beats in mm. in abscissa, to the right in the case of deflection and to the left in the case of rebound. The bottom scale refers to the case of a vehicle under no-load conditions (curve 21) and the top scale to a loaded vehicle (curve 22).

Curve 21 shows the static characteristics of the unloaded vehicle, that is, an 84 percent flexibility at point 23 to which there corresponds an inherent cycle of 0.96 seconds, these being considered as maximum values in the case of a vehicle driven on a road at high speed. In this curve the dynamic coefficient 2, or the ratio of the corresponding loads, is obtained with a 122 mm. deflection, the flexibility being then 25% and the inherent cycle 0.74 second. With 150 mm. of deflection the dynamic coefficient rises to 2.47 and the flexibility drops to 17.5% with a 0.69-second cycle. The curve 22 corresponds to the loaded vehicle.

The chain-dotted line 25 is the isotherm corresponding to the passage from point 23 (no-load) to point 24 at which the equilibrium under load is obtained. At this last point 24 the flexibility is 41% and the cycle 0.81 second. After a 150-mm. deflection the dynamic factor attains 2.90, the flexibility and the inherent cycle being respectively 10% and 0.68 second. The auxiliary or complementary vessel has become effective when the load has attained 600 kg. (point 26), the curve 21 remaining practically unchanged between its useful limits.

Without the auxiliary vessel 14 according to this invention, the curve 22 would have followed the dash line 27 from point 26 up, and with a 120-mm. deflection the dynamic coefficient 3 would have been obtained with a 5.6% flexibility and a 0.56-second cycle, and with a 150-mm. deflection the dynamic factor would have been in excess of 4.8, which would have rendered definitely illusory the use of this suspension stroke in a conventional suspension system.

Although the present invention has been described with specific details and examples, it will be readily understood by anybody conversant with the art that many modifications and variations may be brought thereto, notably with a view to adapt the invention to predetermined flexibility requirements and laws, and to the damping action contemplated.

I claim:

1. A hydropneumatic suspension system element for an automotive vehicle, which element utilizes a constant mass of gas, comprising a wheel carrier arm, a main vessel having a pressure transmitting fluid-filled cylindrical first portion with a piston slidably mounted therein, said piston being connected to said wheel carrier arm and co-acting with said pressure transmitting fluid in said cylindrical first portion, and a spherical second portion solid with the body of the vehicle and separated by a flexible diaphragm into two compartments, one of said compartments being in communication with said cylindrical first portion and containing said pressure transmitting fluid, the other of said compartments being filled by a mass of gas, at least one auxiliary vessel being in communication with said main vessel, each said at least one auxiliary vessel containing a flexible diaphragm separating said auxiliary vessel into first and second chambers, said first chamber being filled with an additional mass of gas which is precompressed to a pressure higher than the pressure normally prevailing in the main vessel when there is a predetermined normal load supported by a wheel on said wheel carrier arm, said second chamber being in communication with said second compartment of said main vessel, and valve means disposed between said first and said second portions of said main vessel for throttling the passage of the pressure transmitting fluid therethrough.

2. A hydropneumatic suspension system element according to claim 1, wherein said flexible diaphragm of said auxiliary vessel is adapted to act as a valve and close off communication between said auxiliary vessel and said main vessel.

References Cited

UNITED STATES PATENTS

| | | | |
|---|---|---|---|
| 2,802,664 | 8/1957 | Jackson | 267—64 |
| 3,321,216 | 5/1967 | Carter | 267—64 |

FOREIGN PATENTS

| | | |
|---|---|---|
| 1,307,189 | 9/1962 | France. |
| 872,885 | 7/1961 | Great Britain. |

ARTHUR L. LA POINT, Primary Examiner

RICHARD A. BERTSCH, Assistant Examiner